3,435,697
CONSTANT TOOTH DEPTH BEVEL GEARS
Raymond Naville, Bienne, Switzerland, assignor to Fabrique de Machines Mikron S.A., Bienne, Switzerland, a corporation of Switzerland
Filed May 22, 1967, Ser. No. 640,211
Claims priority, application Switzerland, Nov. 15, 1966, 16,532/66
Int. Cl. F16h 55/04
U.S. Cl. 74—459.5     2 Claims

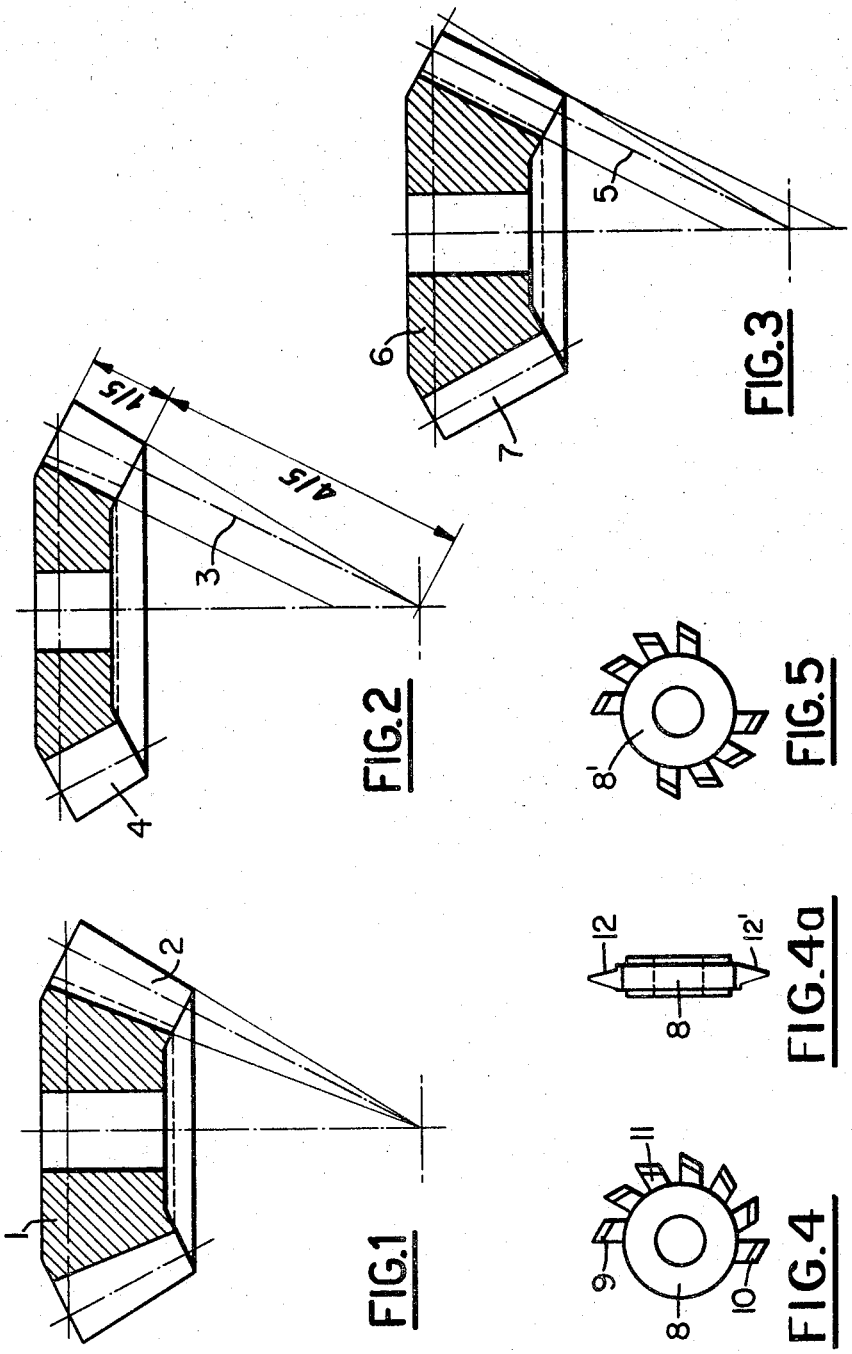

ABSTRACT OF THE DISCLOSURE

Bevel gears presenting a constant tooth depth over the whole tooth length and in which the angular position of the tooth corresponds to the pitch cone of the gear, and a hob therefor having a plurality of knives disposed only about a portion of the periphery of the hob.

---

The object of the present invention is a new design for bevel gears, intended to be used mainly in fine mechanisms. The invention comprises also the necessary shaped tools for the manufacture of these bevel gears.

Other objects and advantages of the present invention will become apparent from a consideration of the following description, taken in connection with the accompanying drawing, in which:

FIGS. 1 and 2 are cross-sectional views of bevel gears according to the prior art;

FIG. 3 is a cross-sectional view of a bevel gear according to the present invention;

FIG. 4 is an elevational view of one embodiment of tooth-cutting device according to the present invention;

FIG. 4a is an edge elevational view of the device of FIG. 4; and

FIG. 5 is a view similar to FIG. 4 but showing another embodiment of tooth-cutting device according to the present invention.

With further reference to the drawing:

The hobbed bevel gears 1 have the geometrical shape shown in FIGURE 1. Each tooth flank 2 is cut by a different tool and the length of the tooth is only limited by the width of the tools cutting the groove.

For fine pitch gears of a module of two and less, the hobbing of which does not justify the price of a special machine, cutting mills having two teeth have been used on a standard gear hobbing machine, the gear bearing shaft of which can be inclined. In order that the involute be correct on the pitch cone 3, the dedendum of the teeth which is at constant depth has to be great enough to give the bottom tooth clearance necessary for the outside diameter where the addendum is the greatest.

In order not to weaken too much the dedendums of the teeth at the inside diameter, the length of the tooth 4 along the cone has been limited to ⅕ of the edge of said cone (FIGURE 2).

The present invention consists in providing a constant tooth depth along the pitch cone 5 (FIGURE 3) taking as a base the shape of the 20° standard pressure angle tooth form on the inside diameter of the bevel gear 6. This has the advantage to be able to choose at will the length of the tooth 7 and the ratio for the inside diameter, and to use cutting tools for the hobbing of the outside cone also and further to increase the bending strength of the teeth for a same bearing surface as compared with the old cutting method of FIG. 2.

The hobs 8 (FIGS. 4 and 4a) and 8' (FIG. 5) used on a simple hobbing machine having an angularly adjustable gear bearing shaft are multiple knife hobs having an involute shaped profile, with one (FIGS. 4 and 4a) or several (FIG. 5) starts, the two end teeth 9 and 10 of which terminate the profile, and the intermediate teeth 11 of which make the rough cut of the teeth (FIGURE 4). Their profiles 12 and 12' correspond to the involute of the inside diameter of the gear to be cut and to the number of teeth desired according to the standard dimensions.

I claim:

1. A multitooth cutter for cutting gears, comprising a hob and a plurality of knives projecting outwardly from the hob and disposed about only a portion of the periphery of the hob, said knives being disposed in a plurality of groups about the periphery of the hob, the knives in each group being spaced apart lesser distances than the distances between said groups.

2. A bevel gear presenting a constant tooth depth on the whole length of the tooth and in which the angular position of the tooth corresponds to the pitch cone angle, the flanks of each tooth being defined by a plurality of straight parallel lines each of which defines with the axis of the gear a plane that intersects the pitch cone of the gear in a line parallel to said straight line.

References Cited

UNITED STATES PATENTS

| | | | |
|---|---|---|---|
| 1,112,509 | 10/1914 | Williams | 74—459.5 |
| 1,178,810 | 4/1916 | Leisse | 74—459.5 |
| 1,286,849 | 12/1918 | Walter | 74—459.5 |
| 1,295,231 | 2/1919 | Stewart et al. | 74—459.5 |
| 2,267,182 | 12/1941 | Wildhaber | 29—103 |

LEONARD H. GERIN, *Primary Examiner.*

U.S. Cl. X.R.

29—103